(12) United States Patent
Zhang et al.

(10) Patent No.: US 9,626,967 B2
(45) Date of Patent: Apr. 18, 2017

(54) INFORMATION PROCESSING METHOD AND ELECTRONIC DEVICE

(71) Applicants: BEIJING LENOVO SOFTWARE LTD., Beijing (CN); LENOVO (BEIJING) LIMITED, Beijing (CN)

(72) Inventors: Danfeng Zhang, Beijing (CN); Yuru Jin, Beijing (CN); Dawei Ji, Beijing (CN)

(73) Assignees: BEIJING LENOVO SOFTWARE LTD., Beijing (CN); LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 14/699,617

(22) Filed: Apr. 29, 2015

(65) Prior Publication Data

US 2016/0163313 A1 Jun. 9, 2016

(30) Foreign Application Priority Data

Dec. 8, 2014 (CN) .......................... 2014 1 0746797

(51) Int. Cl.
| | |
|---|---|
| *G10L 21/00* | (2013.01) |
| *G10L 15/22* | (2006.01) |
| *G10L 15/26* | (2006.01) |
| *G10L 15/30* | (2013.01) |
| *G10L 25/51* | (2013.01) |
| *G10L 17/00* | (2013.01) |
| *G10L 25/78* | (2013.01) |

(52) U.S. Cl.
CPC ............ *G10L 15/22* (2013.01); *G10L 15/265* (2013.01); *G10L 15/30* (2013.01); *G10L 17/00* (2013.01); *G10L 25/51* (2013.01); *G10L 25/78* (2013.01); *G10L 2015/223* (2013.01)

(58) Field of Classification Search
CPC ....... G10L 15/22; G10L 15/30; G10L 15/265; G10L 15/20; G10L 25/78; G10L 15/02; G10L 15/08
USPC ................ 704/235, 275, 231, 233, 251, 270
See application file for complete search history.

(56) References Cited

U.S. PATENT DOCUMENTS

| | | | |
|---|---|---|---|
| 7,418,392 B1 * | 8/2008 | Mozer ..................... | G10L 15/26 315/307 |
| 2012/0075091 A1 * | 3/2012 | Clough .................. | E05F 15/70 340/501 |

(Continued)

*Primary Examiner* — Vu B Hang
(74) *Attorney, Agent, or Firm* — Scully Scott Murphy & Presser

(57) ABSTRACT

The present disclosure discloses an information processing method and an electronic device. The electronic device comprises a first processing unit and a second processing unit. The second processing unit is capable of executing at least one application program. The information processing method comprises: collecting first sound information; when the first sound information comprises first information which matches with audio data preset in the first processing unit, generating a first instruction, and transmitting the first instruction to the second processing unit; when it is determined that there is a first application which meets a predetermined condition in the at least one application program, generating, by the second processing unit, a second instruction based on the first instruction and the first application; and executing the second instruction in the first application.

4 Claims, 6 Drawing Sheets

(56) References Cited

U.S. PATENT DOCUMENTS

| | | | |
|---|---|---|---|
| 2013/0080171 A1* | 3/2013 | Mozer | G10L 15/22 704/251 |
| 2013/0085755 A1* | 4/2013 | Bringert | G10L 15/28 704/235 |
| 2013/0173268 A1* | 7/2013 | Weng | G10L 17/22 704/249 |

* cited by examiner

INFORMATION PROCESSING METHOD AND ELECTRONIC DEVICE

CROSS-REFERENCE TO RELATED APPLICATION(S)

This application claims priority to the Chinese Patent Application No. 201410746797.X, filed on Dec. 8, 2014, entitled "INFORMATION PROCESSING METHOD AND ELECTRONIC DEVICE" which is incorporated herein by reference in its entirety.

TECHNICAL FIELD

The present disclosure relates to information processing technologies, and in particular, to an information processing method and an electronic device.

BACKGROUND

Voice control of Mobile Internet Devices (MIDs) is generally a control mode in which voice commands are used. Such a mode requires a processor to process the voice commands in real time. This control mode in which voice commands are used operates in the background of Application Processes (APs), to collect and recognize voices in real time, which results in a large amount of computations and high power consumption (the power consumption of the APs is at least increased by 100 mW). This is very disadvantageous to power saving of the MIDs, which greatly affects the endurance of mobile devices, and results in poor user experience.

SUMMARY

An information processing method is applied in an electronic device, the information processing method comprising: collecting first sound information; when the first sound information comprises first information which matches with audio data preset in the first processing unit, generating, by a first processing unit, a first instruction, and transmitting the first instruction to a second processing unit; when it is determined that there is a first application which meets a predetermined condition in the at least one application program, generating, by the second processing unit, a second instruction based on the first instruction and the first application, and executing the second instruction in the first application.

An electronic device comprises: a first processing unit comprising a determination unit, a generation unit, and a transmission unit; a second processing unit capable of executing at least one application program; and a collection unit, wherein the collection unit is configured to collect first sound information; the determination unit is configured to, when it is determined that the first sound information comprises first information which matches with audio data preset in the first processing unit, trigger the generation unit; the generation unit is configured to generate a first instruction; the transmission unit is configured to transmit the first instruction to the second processing unit; and the second processing unit is configured to, when it is determined that there is a first application which meets a predetermined condition in the at least one application program, generate a second instruction based on the first instruction and the first application, and execute the second instruction in the first application.

DETAILED DESCRIPTION

In order to obtain further details of features and technical contents of the present disclosure, the implementations of the present disclosure will be described in detail below in conjunction with accompanying drawings. The accompanying drawings are merely used for purpose of illustration, instead of limiting the present disclosure.

Figure 1:
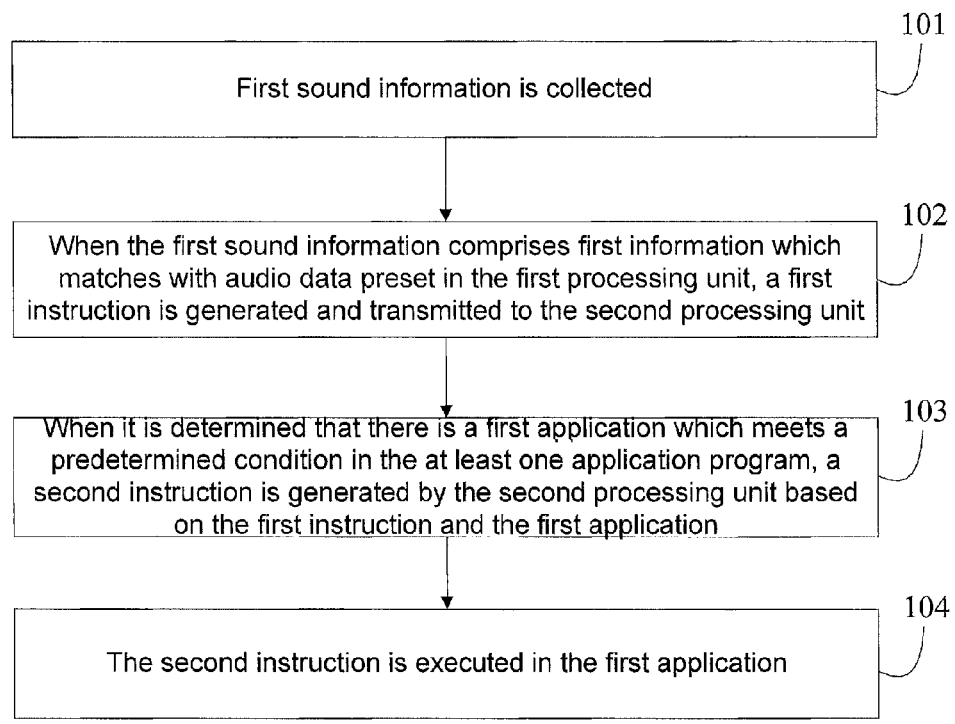
FIG. 1 is a flowchart of an information processing method according to a first embodiment of the present disclosure.

FIG. 1 is a flowchart of an information processing method according to a first embodiment of the present disclosure. The information processing method according to the embodiment of the present disclosure is applied in an electronic device comprising a first processing unit and a second processing unit capable of executing at least one application program. In the embodiment of the present disclosure, the first processing unit may be a Voice Trigger, and the second processing unit may be a CPU. As shown in FIG. 1, the information processing method according to the embodiment of the present disclosure comprises the following steps.

In step 101, first sound information is collected.

In the embodiment of the present disclosure, sounds input from the outside to the electronic device may be collected through a microphone arranged on the electronic device. Of course, the input sounds primarily come from a user of the electronic device. The outside noise needs to be filtered, so as to avoid unnecessary interference to the electronic device.

In step 102, when the first sound information includes first information which matches with audio data preset in the first processing unit, a first instruction is generated and transmitted to the second processing unit.

The collected first sound information is recognized to determine whether the voice input from the outside is a set voice instruction, and if so, the first instruction is generated. In the embodiment of the present disclosure, the preset audio data may be set by a user himself/herself, or may be set before the electronic device leaves the factory, and only when the sound information input from the outside to the electronic device matches with the preset audio data, the first instruction is generated.

In step 103, when it is determined that there is a first application which meets a predetermined condition in the at least one application program, a second instruction is generated by the second processing unit based on the first instruction and the first application.

After receiving the first instruction, the second processing unit determines an application which is currently being invoked, determines a process which is being executed by the application, determines a second instruction according to the process, and executes the second instruction on the application.

Specifically, in the technical solutions according to the embodiment of the present disclosure, the second instruction is decided by judging an application interacting with the user which is currently being executed. For example, if a camera function is currently started by the electronic device, the second instruction is to automatically take a photo.

If there is an incoming call, the second instruction becomes to answer the phone.

If an alarm clock rings, the second instruction becomes to turn off the alarm clock.

If there is information to arrive (within 10 seconds), the second instruction becomes to automatically read the information.

In a media player interface, the second instruction may act as a play function or a pause function.

It should be illustrated that the embodiment of the present disclosure merely enumerates several common applications, and it should be understood that the second instruction may be any other instruction according to processes in different applications. It should be noted that the second instruction is a preset instruction corresponding to a process in an application, and may be pre-configured in the electronic device.

In step 104, the second instruction is executed in the first application.

After generating the second instruction, the second processing unit executes the second instruction on the process corresponding to the first application. In the examples above, when there is currently an incoming call, the second instruction is to answer the phone, and the phone is answered by executing the second instruction. When the alarm clock is currently turned on, the second instruction is to turn off the alarm clock, and the alarm clock is turned off by executing the second instruction. The execution manners of various processes of various other applications will not be described here.

Figure 2:
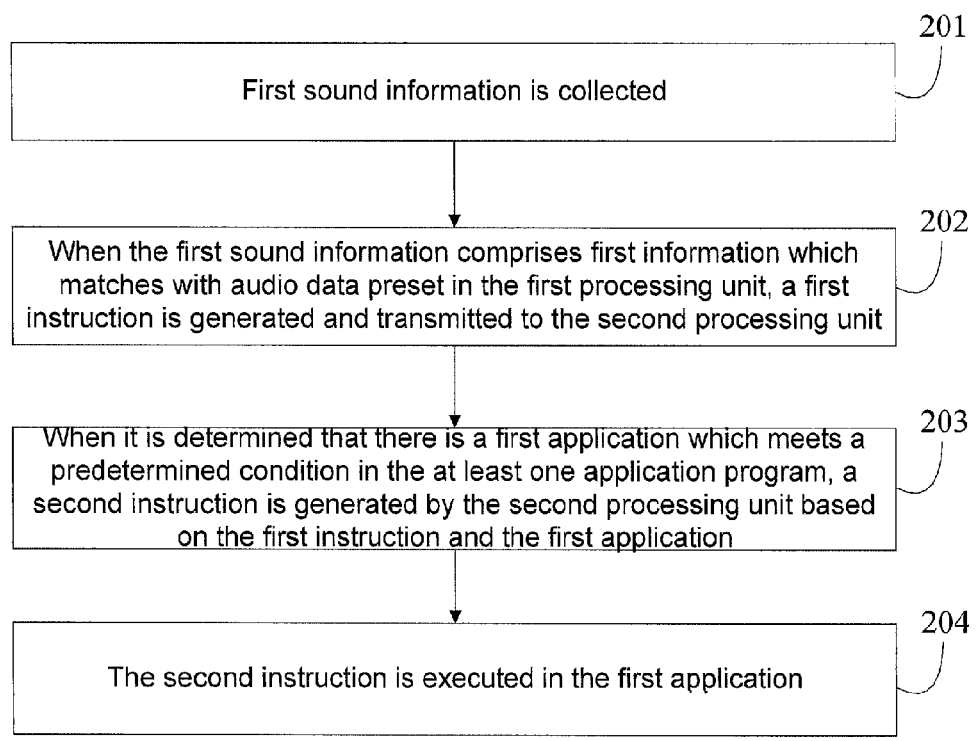
FIG. 2 is a flowchart of an information processing method according to a second embodiment of the present disclosure.

FIG. 2 is a flowchart of an information processing method according to a second embodiment of the present disclosure. The information processing method according to the embodiment of the present disclosure is applied in an electronic device comprising a first processing unit and a second processing unit capable of executing at least one application program. In the embodiment of the present disclosure, the first processing unit may be a Voice Trigger, and the second processing unit may be a CPU. The first processing unit has a voice recognition module arranged therein. As shown in FIG. 2, the information processing method according to the embodiment of the present disclosure comprises the following steps.

In step 201, first sound information is collected.

In the embodiment of the present disclosure, sounds input from the outside to the electronic device may be collected through a microphone arranged on the electronic device. Of course, the input sounds primarily come from a user of the electronic device. The outside noise needs to be filtered, so as to avoid unnecessary interference to the electronic device.

In step 202, when the first sound information includes first information which matches with audio data preset in the first processing unit, a first instruction is generated and transmitted to the second processing unit.

The collected first sound information is recognized to determine whether the voice input from the outside is a set voice instruction, and if so, the first instruction is generated. In the embodiment of the present disclosure, the preset audio data may be set by a user himself/herself, or may be set before the electronic device leaves the factory, and only when the sound information input from the outside to the electronic device matches with the preset audio data, the first instruction is generated.

Specifically, in the embodiment of the present disclosure, generating a first instruction comprises: acquiring, by the voice recognition module, a first parameter of the first sound information; comparing an audio template in the preset audio data with the first parameter, to generate a first comparison result; and when the first comparison result indicates that the audio template matches with the first parameter, generating the first instruction. In the embodiment of the present disclosure, the first parameter may be an audio parameter, i.e., an audio feature of the collected first sound information is acquired and matched with an audio feature template in the preset audio data, and if both match completely, it is considered that the set voice instruction is input to the electronic device, and then the first instruction is generated. It should be illustrated that in the embodiment of the present disclosure, the voice instruction may also be recognized in another manner. For example, a spectrum feature of the user may also be set, and only when the set voice instruction is input by a set user, the first instruction is generated, and when a corresponding voice instruction is input by another user, it is considered to be invalid.

In step 203, when it is determined that there is a first application which meets a predetermined condition in the at least one application program, a second instruction is generated by the second processing unit based on the first instruction and the first application.

After receiving the first instruction, the second processing unit determines an application which is currently being invoked, determines a process which is being executed by the application, determines a second instruction according to the process, and executes the second instruction on the application.

Specifically, in the technical solutions according to the embodiment of the present disclosure, the second instruction is decided by judging an application interacting with the user which is currently being executed. For example, if a camera function is currently started by the electronic device, the second instruction is to automatically take a photo.

If there is an incoming call, the second instruction becomes to answer the phone.

If an alarm clock rings, the second instruction becomes to turn off the alarm clock.

If there is information to arrive (within 10 seconds), the second instruction becomes to automatically read the information.

In a media player interface, the second instruction may act as a play function or a pause function.

It should be illustrated that the embodiment of the present disclosure merely enumerates several common applications, and it should be understood that the second instruction may be any other instruction according to processes in different applications. It should be noted that the second instruction is a preset instruction corresponding to a process in an application, and may be pre-configured in the electronic device.

In step 204, the second instruction is executed in the first application.

After generating the second instruction, the second processing unit executes the second instruction on the process corresponding to the first application. In the examples above, when there is currently an incoming call, the second instruction is to answer the phone, and the phone is answered by executing the second instruction. When the alarm clock is currently turned on, the second instruction is to turn off the alarm clock, and the alarm clock is turned off by executing the second instruction. The execution manners of various processes of various other applications will not be described here.

Figure 3:
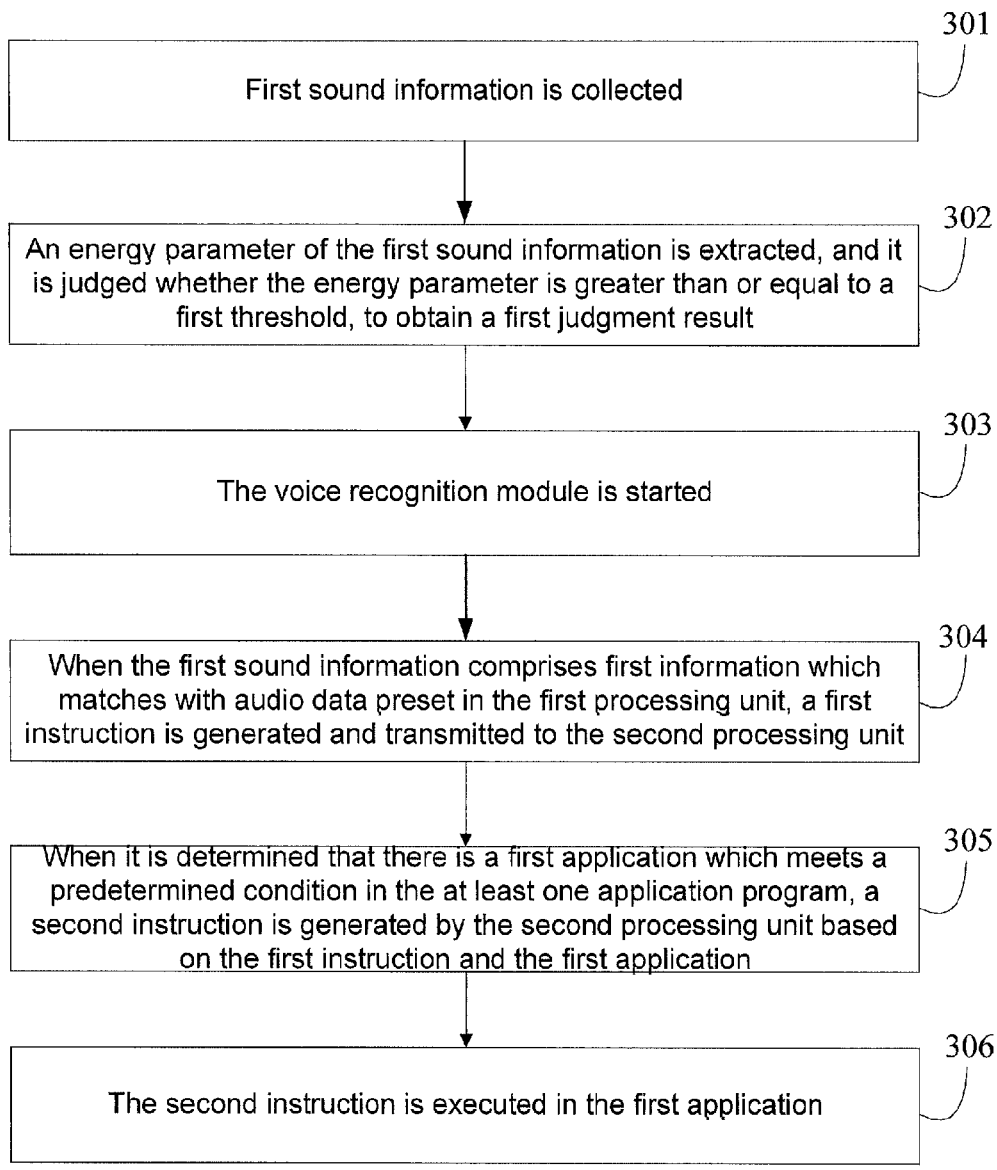
FIG. 3 is a flowchart of an information processing method according to a third embodiment of the present disclosure.

FIG. 3 is a flowchart of an information processing method according to a third embodiment of the present disclosure. The information processing method according to the embodiment of the present disclosure is applied in an electronic device comprising a first processing unit and a second processing unit capable of executing at least one application program. In the embodiment of the present disclosure, the first processing unit may be a Voice Trigger, and the second processing unit may be a CPU. The first processing unit has a voice recognition module arranged therein. As shown in FIG. 3, the information processing method according to the embodiment of the present disclosure comprises the following steps.

In step 301, first sound information is collected.

In the embodiment of the present disclosure, sounds input from the outside to the electronic device may be collected through a microphone arranged on the electronic device. Of course, the input sounds primarily come from a user of the electronic device. The outside noise needs to be filtered, so as to avoid unnecessary interference to the electronic device.

In step 302, an energy parameter of the first sound information is extracted, and it is judged whether the energy parameter is greater than or equal to a first threshold, to obtain a first judgment result; and when the first judgment result indicates that the energy parameter is greater than or equal to the first threshold, step 303 is implemented.

In the embodiment of the present disclosure, there are invariably a variety of voices in an environment where the electronic device is located. After collecting first sound information, the collection unit does not necessarily enable a function of a voice recognition module. That is, when the energy of the first sound information collected by the collection unit is lower than the set threshold, it is considered that the first sound information which is currently collected is a noise, and the voice recognition module is not started. Only when the energy parameter of the collected first sound information achieves the set threshold, it is considered that a voice instruction is consciously input by the user of the electronic device to the electronic device. In this case, the voice recognition module is started.

In step 303, the voice recognition module is started.

In step 304, when the first sound information includes first information which matches with audio data preset in the first processing unit, a first instruction is generated and transmitted to the second processing unit.

The collected first sound information is recognized to determine whether the voice input from the outside is the set voice instruction, and if so, the first instruction is generated. In the embodiment of the present disclosure, the preset audio data may be set by a user himself/herself, or may be set before the electronic device leaves the factory, and only when the sound information input from the outside to the electronic device matches with the preset audio data, the first instruction is generated.

Specifically, in the embodiment of the present disclosure, generating a first instruction comprises: acquiring, by the voice recognition module, a first parameter of the first sound information; comparing an audio template in the preset audio data with the first parameter, to generate a first comparison result; and when the first comparison result indicates that the audio template matches with the first parameter, generating the first instruction. In the embodiment of the present disclosure, the first parameter may be an audio parameter, i.e., an audio feature of the collected first sound information is acquired and matched with an audio feature template in the preset audio data, and if both match completely, it is considered that a set voice instruction is input to the electronic device, and the first instruction is generated. It should be illustrated that in the embodiment of the present disclosure, the voice instruction may also be recognized in another manner. For example, a spectrum feature of the user may also be set, and only when the set voice instruction is input by a set user, the first instruction is generated, and when a corresponding voice instruction is input by another user, it is considered to be invalid.

In step 305, when it is determined that there is a first application which meets a predetermined condition in the at least one application program, a second instruction is generated by the second processing unit based on the first instruction and the first application.

After receiving the first instruction, the second processing unit determines an application which is currently being invoked, determines a process which is being executed by the application, determines a second instruction according to the process, and executes the second instruction on the application.

Specifically, in the technical solutions according to the embodiment of the present disclosure, the second instruction is decided by judging an application interacting with the user which is currently being executed. For example, if a camera function is currently started by the electronic device, the second instruction is to automatically take a photo.

If there is an incoming call, the second instruction becomes to answer the phone.

If an alarm clock rings, the second instruction becomes to turn off the alarm clock.

If there is information to arrive (within 10 seconds), the second instruction becomes to automatically read the information.

In a media player interface, the second instruction may act as a play function or a pause function.

It should be illustrated that the embodiment of the present disclosure merely enumerates several common applications, and it should be understood that the second instruction may be any other instruction according to processes in different applications. It should be noted that the second instruction is a preset instruction corresponding to a process in an application, and may be pre-configured in the electronic device.

In step 306, the second instruction is executed in the first application.

After generating the second instruction, the second processing unit executes the second instruction on the process corresponding to the first application. In the examples above, when there is currently an incoming call, the second instruction is to answer the phone, and the phone is answered by executing the second instruction. When the alarm clock is currently turned on, the second instruction is to turn off the alarm clock, and the alarm clock is turned off by executing the second instruction. The execution manners of various processes of various other applications will not be described here.

Figure 4:
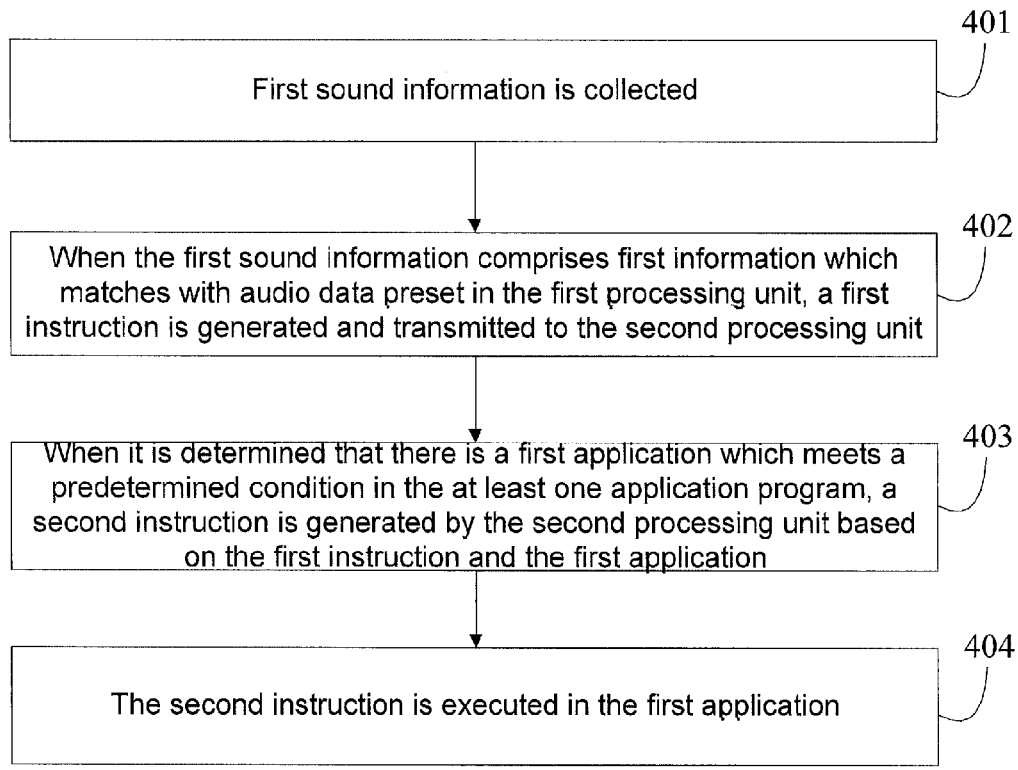
FIG. 4 is a flowchart of an information processing method according to a fourth embodiment of the present disclosure.

FIG. 4 is a flowchart of an information processing method according to a fourth embodiment of the present disclosure. The information processing method according to the embodiment of the present disclosure is applied in an electronic device comprising a first processing unit and a second processing unit capable of executing at least one application program. In the embodiment of the present disclosure, the first processing unit may be a Voice Trigger, and the second processing unit may be a CPU. The first processing unit has a voice recognition module arranged therein. As shown in FIG. 4, the information processing method according to the embodiment of the present disclosure comprises the following steps.

In step 401, first sound information is collected.

In the embodiment of the present disclosure, sounds input from the outside to the electronic device may be collected through a microphone arranged on the electronic device. Of course, the input sounds primarily come from a user of the electronic device. The outside noise needs to be filtered, so as to avoid unnecessary interference to the electronic device.

In step 402, when the first sound information includes first information which matches with audio data preset in the first processing unit, a first instruction is generated and transmitted to the second processing unit.

The collected first sound information is recognized to determine whether the voice input from the outside is the set voice instruction, and if so, the first instruction is generated. In the embodiment of the present disclosure, the preset audio data may be set by a user himself/herself, or may be set before the electronic device leaves the factory, and only when the sound information input from the outside to the electronic device matches with the preset audio data, the first instruction is generated.

Specifically, in the embodiment of the present disclosure, generating a first instruction comprises: acquiring, by the voice recognition module, a first parameter of the first sound information; comparing an audio template in the preset audio data with the first parameter, to generate a first comparison result; and when the first comparison result indicates that the audio template matches with the first parameter, generating the first instruction. In the embodiment of the present disclosure, the first parameter may be an audio parameter, i.e., an audio feature of the collected first sound information is acquired and matched with an audio feature template in the preset audio data, and if both match completely, it is considered that a set voice instruction is input to the electronic device, and the first instruction is generated. It should be illustrated that in the embodiment of the present disclosure, the voice instruction may also be recognized in another manner. For example, a spectrum feature of the user may also be set, and only when the set voice instruction is input by a set user, the first instruction is generated, and when a corresponding voice instruction is input by another user, it is considered to be invalid.

In step 403, when it is determined that there is a first application which meets a predetermined condition in the at least one application program, a second instruction is generated by the second processing unit based on the first instruction and the first application.

After receiving the first instruction, the second processing unit determines an application which is currently being invoked, determines a process which is being executed by the application, determines a second instruction according to the process, and executes the second instruction on the application.

Generating a second instruction based on the first instruction and the first application comprises: judging that a first process of the first application is invoked by the second processing unit; acquiring an identity of the first process and matching the identity of the first process with process identities in a process identity library; and when it is determined that the identity of the first process matches with a second process identity in the process identity library, obtaining an instruction corresponding to the second process identity as the second instruction. In the embodiment of the present disclosure, there are multiple applications executed in the second processing unit, and after receiving the first instruction, the second processing unit determines an application which is currently being invoked, determines a process of the application, searches for a corresponding instruction set for an identity of the process according to the identity of the process, uses the searched instruction as the second instruction, and executes the second instruction on the process.

In the embodiment of the present disclosure, an instruction executed for an application is determined according to a current executive condition of the application.

Specifically, in the technical solutions according to the embodiment of the present disclosure, the second instruction is decided by judging an application interacting with the user which is currently being executed. For example, if a camera function is currently started by the electronic device, the second instruction is to automatically take a photo.

If there is an incoming call, the second instruction becomes to answer the phone.

If an alarm clock rings, the second instruction becomes to turn off the alarm clock.

If there is information to arrive (within 10 seconds), the second instruction becomes to automatically read the information.

In a media player interface, the second instruction may act as a play function or a pause function.

It should be illustrated that the embodiment of the present disclosure merely enumerates several common applications, and it should be understood that the second instruction may be any other instruction according to processes in different applications. It should be noted that the second instruction is a preset instruction corresponding to a process in an application, and may be pre-configured in the electronic device.

In step 404, the second instruction is executed in the first application.

After generating the second instruction, the second processing unit executes the second instruction on the process corresponding to the first application. In the examples above, when there is currently an incoming call, the second instruction is to answer the phone, and the phone is answered by executing the second instruction. When the alarm clock is currently turned on, the second instruction is to turn off the alarm clock, and the alarm clock is turned off by executing the second instruction. The execution manners of various processes of various other applications will not be described here.

Figure 5:
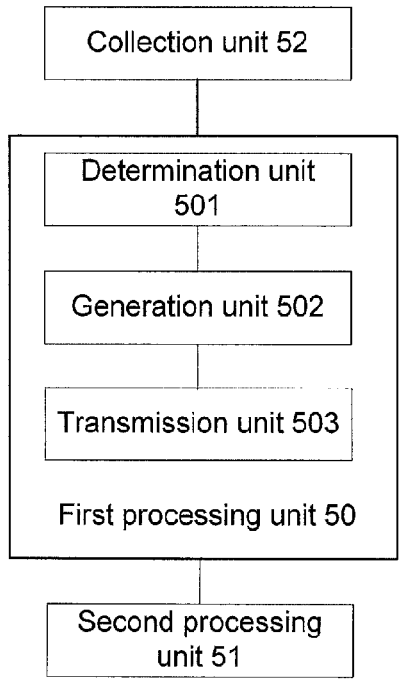
FIG. 5 is a structural diagram of constitution of an electronic device according to a first embodiment of the present disclosure.

FIG. 5 is a structural diagram of composition of an electronic device according to a first embodiment of the present disclosure. As shown in FIG. 5, the electronic device comprises a first processing unit 50 including a determination unit 501, a generation unit 502, and a transmission unit 503; a second processing unit 51 capable of executing at least one application program; and a collection unit 52, wherein, the collection unit 52 is configured to collect first sound information; in the embodiment of the present disclosure, the collection unit may be a microphone in the electronic device; and the collection unit 52 is configured to collect sound information in an environment where the electronic device is located; the determination unit 501 is configured to, when it is determined that the first sound information includes first information which matches with audio data preset in the first processing unit, trigger the generation unit; the generation unit 502 is configured to generate a first instruction; the transmission unit 503 is configured to transmit the first instruction to the second processing unit; and the second processing unit 51 is configured to, when it is determined that there is a first application which meets a predetermined condition in the at least one application program, generate a second instruction based on the first instruction and the first application, and execute the second instruction in the first application.

In the embodiment of the present disclosure, the first processing unit may be a Voice Trigger, and the second processing unit may be a CPU.

In the embodiment of the present disclosure, the first processing unit 50 may have a voice recognition module (not shown in FIG. 5) arranged therein.

The voice recognition module is configured to acquire a first parameter of the first sound information; compare an audio template in the preset audio data with the first parameter, to generate a first comparison result; and when the first comparison result indicates that the audio template matches with the first parameter, generate the first instruction.

In the embodiment of the present disclosure, in consideration of saving power consumption of the electronic device, the voice recognition module is arranged in the first processing unit 50. In a case that there is no service, the electronic device can enter a sleep state, and only the first processing unit needs to operate. The collection unit is configured to collect sound information in the environment in real time, and when the energy of the collected sound information is lower than a set threshold, the voice recognition module is not started, and only when the energy of the sound information exceeds the set threshold, the voice recognition module is started.

Those skilled in the art should understand that the implementation functions of various units in the electronic device illustrated in FIG. 5 may be understood with reference to related description of the information processing method above. The functions of various units in the electronic device illustrated in FIG. 5 may be implemented by programs executing on a processor, or may also be implemented by specific logic circuits.

Figure 6:
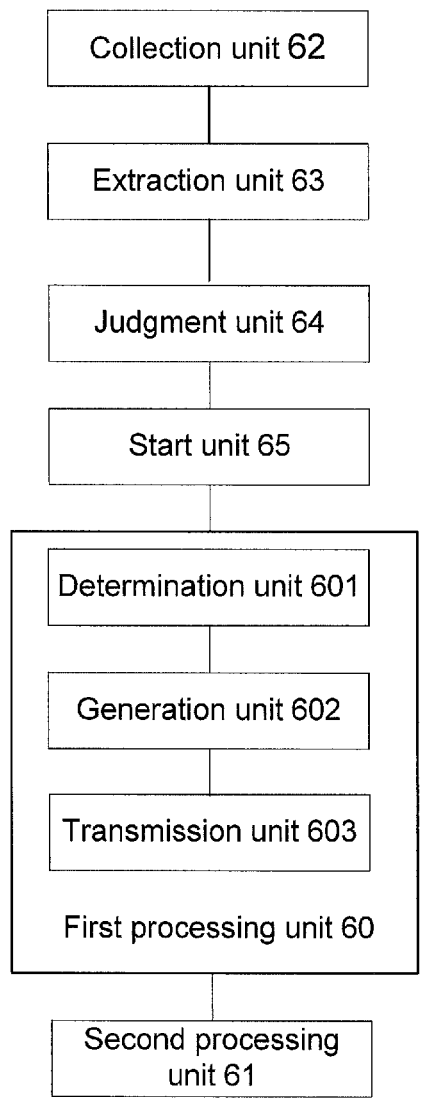
FIG. 6 is a structural diagram of constitution of an electronic device according to a second embodiment of the present disclosure.

FIG. 6 is a structural diagram of composition of an electronic device according to a second embodiment of the present disclosure. As shown in FIG. 6, the electronic device comprises a first processing unit 60 including a determination unit 601, a generation unit 602, and a transmission unit 603; a second processing unit 61 capable of executing at least one application program; and a collection unit 62; an extraction unit 63; a judgment unit 64; and a start unit 65, wherein, the collection unit 62 is configured to collect first sound information; in the embodiment of the present disclosure, the collection unit may be a microphone in the electronic device; and the collection unit 62 is configured to collect sound information in an environment where the electronic device is located; the extraction unit 63 is configured to extract an energy parameter of the first sound information; the judgment unit 64 is configured to judge whether the energy parameter is greater than or equal to a first threshold, to obtain a first judgment result; and the start unit 65 is configured to, when the first judgment result indicates that the energy parameter is greater than or equal to the first threshold, start the voice recognition module.

The determination unit 601 is configured to, when it is determined that the first sound information includes first information which matches with preset audio data in the first processing unit, trigger the generation unit; the generation unit 602 is configured to generate a first instruction; the transmission unit 603 is configured to transmit the first instruction to the second processing unit; and the second processing unit 61 is configured to, when it is determined that there is a first application which meets a predetermined condition in the at least one application program, generate a second instruction based on the first instruction and the first application, and execute the second instruction in the first application.

In the embodiment of the present disclosure, the first processing unit may be a Voice Trigger, and the second processing unit may be a CPU.

In the embodiment of the present disclosure, the first processing unit 60 may have a voice recognition module (not shown in FIG. 6) arranged therein.

The voice recognition module is configured to acquire a first parameter of the first sound information; compare an audio template in the preset audio data with the first parameter, to generate a first comparison result; and when the first comparison result indicates that the audio template matches with the first parameter, generate the first instruction.

In the embodiment of the present disclosure, in consideration of saving power consumption of the electronic device, the voice recognition module is arranged in the first processing unit 50. In a case that there is no service, the electronic device can enter a sleep state, and only the first processing unit needs to operate. The collection unit is configured to collect sound information in the environment in real time, and when the energy of the collected sound information is lower than a set threshold, the voice recognition module is not started, and only when the energy of the sound information exceeds the set threshold, the voice recognition module is started.

Those skilled in the art should understand that the implementation functions of various units in the electronic device illustrated in FIG. 6 may be understood with reference to related description of the information processing method above. The functions of various units in the electronic device illustrated in FIG. 6 may be implemented by programs executing on a processor, or may also be implemented by specific logic circuits.

Figure 7:
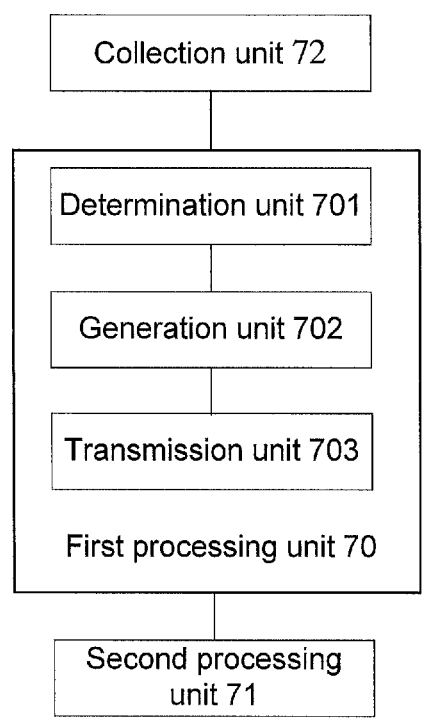
FIG. 7 is a structural diagram of constitution of an electronic device according to a third embodiment of the present disclosure.

FIG. 7 is a structural diagram of composition of an electronic device according to a third embodiment of the present disclosure. As shown in FIG. 7, the electronic device comprises a first processing unit 70 including a determination unit 701, a generation unit 702, and a transmission unit 703; a second processing unit 71 capable of executing at least one application program; and a collection unit 72, wherein, the collection unit 72 is configured to collect first sound information; in the embodiment of the present disclosure, the collection unit may be a microphone in the electronic device; and the collection unit 72 is configured to collect sound information in an environment where the electronic device is located; the determination unit 701 is configured to, when it is determined that the first sound information includes first information which matches with audio data preset in the first processing unit, trigger the generation unit; the generation unit 702 is configured to generate a first instruction; the transmission unit 703 is configured to transmit the first instruction to the second processing unit; and the second processing unit 71 is configured to, when it is determined that there is a first application which meets a predetermined condition in the at least one application program, generate a second instruction based on the first instruction and the first application, and execute the second instruction in the first application.

In the embodiment of the present disclosure, the first processing unit may be a Voice Trigger, and the second processing unit may be a CPU.

In the embodiment of the present disclosure, the first processing unit 70 may have a voice recognition module (not shown in FIG. 7) arranged therein.

The voice recognition module is configured to acquire a first parameter of the first sound information; compare an audio template in the preset audio data with the first parameter, to generate a first comparison result; and when the first comparison result indicates that the audio template matches with the first parameter, generate the first instruction.

In the embodiment of the present disclosure, in consideration of saving power consumption of the electronic device, the voice recognition module is arranged in the first processing unit 70. In a case that there is no service, the electronic device can enter a sleep state, and only the first processing unit needs to operate. The collection unit is configured to collect sound information in the environment in real time, and when the energy of the collected sound information is lower than a set threshold, the voice recognition module is not started, and only when the energy of the sound information exceeds the set threshold, the voice recognition module is started.

In the embodiment of the present disclosure, the second processing unit 71 is further configured to, when the first instruction is received, determine that a first process of the first application is invoked, acquire an identity of the first process and match the identity of the first process with process identities in a process identity library, and when it is determined that the identity of the first process matches with a second process identity in the process identity library, obtain an instruction corresponding to the second process identity as a second instruction.

Those skilled in the art should understand that the implementation functions of various units in the electronic device illustrated in FIG. 7 may be understood with reference to related description of the information processing method above. The functions of various units in the electronic device illustrated in FIG. 7 may be implemented by programs executing on a processor, or may also be implemented by specific logic circuits.

In the embodiments of the present disclosure, the voice recognition module is arranged in the first processing unit, to recognize the collected voice, and when it is determined that the collected voice matches with a voice template, generate a first instruction which is transmitted to the second processing unit. The second processing unit determines an application which is currently being executed, determines a second instruction according to a process which is currently being started by the application, and executes the second instruction on the application. In the embodiments of the present disclosure, the voice recognition module is arranged in the first processing unit without starting the second processing unit all the time, and only when a voice which matches with the voice template is received, the second processing unit is started, or an application executed in the second processing unit is correspondingly processed. Thereby, the technical solutions according to the embodiments of the present disclosure achieve more power saving of the electronic device.

Without a conflict, the technical solutions of the various embodiments above can be combined with each other.

It should be understood that the methods and intelligent devices disclosed in the embodiments of the present disclosure may be implemented in other manners. The device embodiments as described above are merely illustrative. For example, the division of the units is merely a logically functional division, and in practice, there may be other division manners. For example, multiple units or components may be combined or may be integrated into another system, or some features may be ignored or may not be implemented. In addition, various constituent parts, which are displayed or discussed as being coupled or communicatively connected directly, may also be coupled or communicatively connected indirectly via some interfaces, devices or units in an electrical manner, a mechanical manner, or other manners.

The above units described as separate components may be or may not be separated physically. The components displayed as units may be or may not be physical units, i.e., they may be located in a place or may also be distributed among multiple network units. A part or all of the units may be selected as needed to achieve the purpose of the solutions of the embodiments.

In addition, various functional units according to the embodiments of the present disclosure may all be integrated into a processing module, or various units may be used separately, or two or more units are integrated into a unit. The above integrated units may be implemented by hardware or by hardware and software functional units.

A person having ordinary skill in the art can understand that all or a part of steps for implementing the above method embodiments may be implemented by programs instructing related hardware. The programs above may be stored in a computer readable storage medium. When the programs are executed, the steps of the above method embodiments are implemented. The storage medium above may be a medium which can store application codes, such as a mobile storage device, a Read-Only Memory (ROM), a Random Access Memory (RAM), a disk, or a disc etc.

Alternatively, the integrated unit according to the embodiments of the present disclosure may also be stored in a computer readable storage medium when it is implemented in a form of software functional module and is sold or used as an independent product. Based on this understanding, the substance of the technical solutions according to the embodiments of the present disclosure or portions of the technical solutions which contribute to the related art may be embodied in a form of software product. The computer software product is stored in a storage medium, including a number of instructions to enable a computer device (which may be a personal computer, a server, or a network device or the like) to perform all or a part of the methods according to various embodiments of the present disclosure. The storage medium described above may be a medium which can store application codes, such as a mobile storage device, a Read-Only Memory (ROM), a Random Access Memory (RAM), a disk, or a disc or the like.

The above description is merely specific embodiments of the present disclosure, and the scope of the present disclosure is not limited thereto. Changes or substitutions, which can be obviously envisaged by those skilled persons in the art, should be included in the scope of the present disclosure without departing the scope defined by the appended claims.

We claim:

1. An information processing method applied in an electronic device comprising at least one hardware processor for implementing a first processing unit, a second processing unit and a collection unit, wherein the first processing unit comprises a voice recognition module, the information processing method comprising:

collecting, with the collection unit, first sound information;

extracting, with the first processing unit, an energy parameter of the first sound information and determining, with the first processing unit, whether the energy parameter is greater than or equal to a first threshold;

starting the voice recognition module when it is determined that the energy parameter is greater than or equal to the first threshold;
generating a first instruction and transmitting the first instruction to the second processing unit when the first sound information comprises first information which matches with audio data preset in the first processing unit;
wherein the generating the first instruction comprises:
acquiring, with the voice recognition module, a first parameter of the first sound information;
comparing, with the first processing unit, an audio template in the preset audio data with the first parameter to generate a first comparison result; and
generating, with the first processing unit, the first instruction when the first comparison result indicates that the audio template matches with the first parameter;
generating, with the second processing unit, a second instruction based on the first instruction and a first application when the second processing unit determines that there is the first application, which meets a predetermined condition, in at least one application program, wherein the second instruction is one of a plurality of predetermined instructions and the first instruction is of equally applicable to generate each one of the plurality of predetermined instructions; and
executing, the second processing unit, the second instruction in the first application.

2. The information processing method according to claim 1, wherein the generating of a second instruction based on the first instruction and the first application comprises:
judging, with the second processing unit, that a first process of the first application is invoked by the second processing unit;
acquiring, with the second processing unit, an identity of the first process and matching, with the second processing unit, the identity of the first process with process identities in a process identity library; and
obtaining, with the second processing unit, an instruction corresponding to a second process identity as the second instruction when it is determined that the identity of the first process matches with the second process identity in the process identity library.

3. An electronic device, comprising at least one hardware processor for implementing a first processing unit, a second processing unit, and a collection unit, the second processing unit being capable of executing at least one application program, the first processing unit comprising a determination unit, a generation unit, a transmission unit, a voice recognition module, an extraction unit, a judgment unit and a start unit, wherein
the collection unit is configured to collect first sound information;
the extraction unit is configured to extract an energy parameter of the first sound information;
the judgment unit is configured to judge whether the energy parameter is greater than or equal to a first threshold, to obtain a first judgment result;
the start unit is configured to start the voice recognition module when the first judgment result indicates that the energy parameter is greater than or equal to the first threshold;
the voice recognition module is configured to: acquire a first parameter of the first sound information; compare an audio template in the preset audio data with the first parameter to generate a first comparison result; and generate the first instruction when the first comparison result indicates that the audio template matches with the first parameter;
the determination unit is configured to trigger the generation unit when it is determined that the first sound information comprises first information which matches with audio data preset in the first processing unit;
the generation unit is configured to generate a first instruction;
the transmission unit is configured to transmit the first instruction to the second processing unit; and
the second processing unit is configured to generate a second instruction based on the first instruction and a first application when the second processing unit determines that there is the first application, which meets a predetermined condition, in the at least one application program, and to execute the second instruction in the first application, wherein the second instruction is one of a plurality of predetermined instructions and the first instruction is equally applicable to generate each of the plurality of predetermined instructions.

4. The electronic device according to claim 3, wherein the second processing unit is further configured to determine that a first process of the first application is invoked, when the first instruction is received; to acquire an identity of the first process and match the identity of the first process with process identities in a process identity library; and to obtain an instruction corresponding to a second process identity as the second instruction when it is determined that the identity of the first process matches with the second process identity in the process identity library.

* * * * *